United States Patent [19]

Quets

[11] 4,058,592
[45] Nov. 15, 1977

[54] PREPARATION OF SUB-MICRON METAL OXIDE POWDERS FROM CHLORIDE-CONTAINING COMPOUNDS

[75] Inventor: Jean Marie Louis Joseph Quets, White Plains, N.Y.

[73] Assignee: Union Carbide Corporation, New York, N.Y.

[21] Appl. No.: 701,167

[22] Filed: June 30, 1976

[51] Int. Cl.$^2$ ............... C01G 49/00; C01G 23/00
[52] U.S. Cl. ............... 423/594; 423/598; 252/62.59; 252/62.63; 252/63.5; 106/73.3; 106/73.31; 252/62.9
[58] Field of Search ............... 423/594, 598, 593; 252/62.56, 62.59, 62.63; 106/73.3, 73.31

[56] References Cited

U.S. PATENT DOCUMENTS

| 2,758,911 | 8/1956 | Lynd | 423/598 |
| 3,049,404 | 8/1962 | Wade | 423/594 |
| 3,549,315 | 12/1970 | Lester | 423/598 |
| 3,634,254 | 1/1972 | Micheli | 252/62.63 |
| 3,826,755 | 7/1974 | Grimes | 252/67.63 |
| 3,862,046 | 1/1975 | Walker | 106/73.31 |

FOREIGN PATENT DOCUMENTS 1,253,807  11/1971  United Kingdom ............... 423/594

Primary Examiner—Edward J. Meros
Assistant Examiner—Brian E. Hearn
Attorney, Agent, or Firm—William Raymond Moran

[57] ABSTRACT

Sub-micron metal oxide powders, such as barium titanate, are prepared by mixing a carbohydrate material with solution of barium and titanium compounds, and in some instances other metal compounds, followed by ignition and calcining of the mixture to give sub-micron size particles of barium titanate loosely held together in friable aggregates. For economic reasons as well as their commercial availability, inorganic chlorides are suitable for use as one or more of the starting compounds. However, the presence of a chloride compound greatly influences the thermal stability of that compound in the mixture and hence its rate of decomposition was found to be slow. Accordingly, after the ignition step any chlorides present in the mixture are removed before calcination. The process provides a means for the direct formation of barium titanate free of unwanted phases and which is chemically pure. Barium titanate can also be prepared as an intimate mixture or as a solid solution with other oxides.

5 Claims, No Drawings

PREPARATION OF SUB-MICRON METAL OXIDE POWDERS FROM CHLORIDE-CONTAINING COMPOUNDS

This invention relates in general to a process for the preparation of sub-micron metal oxide powders, particularly, barium titanate powders. In one aspect this invention is directed to a process for preparing chemically pure barium titanate powders. In a further aspect the invention relates to the preparation of barium titanate in admixture or in a solution with other oxides. In another aspect, the invention is directed to the preparation of certain ferrite powders.

In Belgian Pat. No. 766,962, which is assigned to the same assignee as the present invention, there is disclosed a process for the preparation of finely divided metal oxides and their use in the preparation of sintered objects. In the disclosed process inorganic chlorides are stated to be useful for the preparation of the loading solutions. However, in the course of experimentation with chloride containing solutions it was found that the thermal stability of the compounds present during pyrolysis greatly influenced the final products. Preferably, small grains of barium titanate should be formed during ignition. However, if one of the components of the loading solution is too stable, its decomposition to the oxide during ignition will be greatly slowed and retard the formation of barium titanate. In that respect, barium chloride was found to be stable under normal ignition procedures, thus retarding the formation of barium titanate. For that reason, the process had to be optimized to allow for the use of the inexpensive and readily available chlorides. Several improvements were introduced to transorm the original precursor process in such a way that barium titanate would be obtained directly by ignition.

Accordingly, one or more of the following objects will be achieved by the practice of this invention. An object of this invention is to provide a process for the direct formation of barium titanate powders which are free of unwanted phases. A further object is to provide a process for the preparation of chemically pure barium titanate powder. A still further object is to prepare powders which are comprised of a solid solution of barium titanate and one or more other oxides. Another object is to provide a process for the preparation of certain sub-micron ferrite powders. These and other objects will readily become apparent to those skilled in the art in the light of the teachings herein set forth.

In its broad aspect, the present invention is directed to a process for the preparation of sub-micron metal oxide powders. The process comprises the steps of:
a. contacting a carbohydrate material with a compound containing at least two metals selected from the group consisting of barium, titanium, iron and strontium, at least one of which compounds contains a chloride ion to form a mixture thereof,
b. igniting the mixture of step (a) to produce fragile agglomerates of sub-micron particles,
c. contacting the agglomerates with an aqueous solution of a soluble ammonium salt to form ammonium chloride,
d. recovering the agglomerates from solution and washing to remove any ammonium chloride,
e. calcining the agglomerates to convert said mixture to the metal oxide, and
f. comminuting the agglomerates to produce finely divided metal oxide powders having a mean particle size below 1 micron.

The process of this invention offers several advantages over methods presently employed for the preparation of metal oxides. Of principal importance it yields metal oxide such as barium titanate, without the presence of any unwanted phases. The barium titanate produced is single phase, chemically pure, and consists of very fine crystallites of high surface area and in a state of extremely fine dispersion. This process is simple, flexible in its operation, does not require an overly specialized equipment and is devoid of any difficult and time consuming operations. The workable range of carbohydrate concentration is wide since its upper limit is dictated more by the economics rather than by the chemistry of the process. Although there is a lower limit in the amount of carbohydrate to be used, slight departures do not adversely affect the product. The process is a pyrolytic process and the barium titanate powder is produced directly as a dry pwoder, ready for use without the necessity for filtering and drying. The process is also flexible in terms of stoichiometry. Slight deviations from the purely stoichiometric compound are often preferred. They can easily be obtained by small compositional variations in the starting solutions without affecting the process.

Thus, a first embodiment of this invention is directed to the preparation of barium titanate powders wherein the chloride ions are removed prior to the calcination step. As previously indicated, the metal containing compounds are loaded onto a carbohydrate material.

Loading solutions are prepared from reagent grade titanium tetrachloride or titanium trichloride, and barium chloride or barium nitrate. Titanium tetrachloride has the inconvenience of a very rapid hydrolysis. However, with care an acidic solution can be prepared. For convenience, it is preferred to prepare the titanium tetrachloride directly in corn syrup by the following method: equal volume of corn syrup and water are thoroughly mixed. This solution is then made acidic by the addition of 5 volume percent of concentrated hydrochloric acid. To this solution 10 volume percent of titanium tetrachloride is slowly added under strong agitation. This solution contains approximately 55g of $TiO_2$ per liter. It is stable over a long period of time but will slowly turn black due to a degradation of the corn syrup by the acid.

Titanium trichloride, as received, is a commercial solution containing about 135.5g $TiO_2$ per liter. It is easily diluted in all proportions. Barium chloride and nitrate are easily dissolved in water in the absence of carbonate ions.

Two distinct types of corn syrup preparations are prepared from the previous solution. All-chloride solutions are prepared by mixing one of the titanium chloride solutions with barium chloride, while chloride-nitrate solutions are prepared with barium nitrate instead. For the preparation of the loading solutions, each solution is first assayed and adequate volumes measured to obtain a titanium to barium molar ratio equal to about 1. In all solution preparations, the amount of corn syrup is adjusted to account for approximately 50% of the total volume.

In addition to corn syrup, paper pulp can be used as the carbohydrate material. The paper pulp preparations are prepared from titanium trichloride and barium chloride as an all-chloride preparation or barium nitrate as a chloride-nitrate preparation. Preparations are obtained by soaking the paper pulp in the loading solution for several hours, usually overnight. The excess solution is removed by rapid centrifugation.

The corn syrup preparations are then slowly heated until charred. During this process, the solutions are dehydrated while degradation of the cornsyrup occurs. Degradation of the corn syrup in the preparation is allowed to proceed until a char is obtained. This char is amorphous since its X-ray diffraction patterns do not show any specific crystallinity. After completion of the charing, the chars are ignited in air in a furnace at a temperature of from about 350° C to about 1000° C and preferably 600° C.

Ignition of the loaded paper pulp is also carried out with an excess of air in a furnace at 600° C. Because of the exothermic aspect of the ignition, the true temperature of the char or the paper pulp during ignition is always much higher than the furnace temperature, but only for a short time, and a fine powder is obtained. Barium titanate is not easily obtained from ignition of the chars. During ignition the chlorides of titanium are easily and readily converted to titanium oxide. On the other hand, barium chloride is very stable and cannot be easily converted to the oxide during ignition Barium nitrate, however, is readily converted to the chloride rather than the oxide, when titanium chloride is used in the loading solution. This is shown by X-ray diffraction of the phases obtained from the all-chloride and chloride-nitrate preparations, regardless of their composition.

A variation of the charring process consists of spray drying the loaded corn syrup solution to a dry powder which is then ignited in air. In contrast to the char, the dry powder is not carbonized and it is still soluble. Charring and carbon removal then occur simultaneously during the air ignition.

Although chlorides are not converted during ignition, they can be removed by treating the ignited powders with a concentrated solution of an ammonium compound such as ammonium carbonate or ammonium hydroxide. In this process, barium chloride reacts with ammonium carbonate to yield insoluble barium carbonate and ammonium chloride. This reaction is very rapid, and its completeness is assured by a thorough agitation of the ignited powders with an excess of ammonium carbonate. After the reaction is completed, the resulting titanium oxide-barium carbonate mixture is separated from the solution. The resulting slurry is then thoroughly washed with distilled water until all soluble ammonium salts are removed. Although ammonium carbonate is not deleterious to the formation of pure barium titanate, any ammonium chloride left will readily react during the subsequent heat treatment to yield barium chloride. Washing with distilled water must be continued until all traces of ammonium chloride are removed.

The resulting powder, composed of a mixture of titanium oxide and barium carbonate, is then calcined to yield barium titanate directly. Calcination temperatures and time at temperature are critical for the formation of a fine grained barium titanate. Calcination temperatures should be high enough and residence time long enough to obtain a complete reaction of the mixture. However, high temperatures and long residence times will promote grain coarsening. Because of the intimate character of the titanium oxide - barium carbonate mixture, this calcination can be accomplished at the relatively low temperature from about 600° to about 700° C. This range of temperatures is sufficiently low that little grain growth would occur, even for long periods of time.

The progress of the calcination can be followed by X-ray diffraction. X-ray patterns of the powders prior to any calcination always show the characteristic peaks of barium carbonate as their main features together with very broad peaks characteristic of fine grained titanium oxide. After a certain time at temperature, X-ray diffraction shows the presence of barium titanate in addition to the original mixture. As time at temperature is increased, X-ray diffraction patterns to show that an increased amount of barium titanate is formed at the expense of the titanium oxide - barium carbonate mixture. X-ray line broadening indicates the barium titanate crystallites keep a constant size throughout the low temperature calcination. For higher temperatures, this is no longer true however, and grain growth is evident.

Since the presence of chlorides during ignition precludes the direct formation of barium titanate by the preferential formation of barium chloride, a process improvement consists of an early removal of the chloride Conversion of the chlorides with an ammonium compound prior to ignition is effective provided that the soluble ammonium chloride can be removed, and that phase separation by precipitation can be prevented. Any attempt at early chloride removal from a corn syrup preparation will understandably lead to failure since neither of the two previous conditions could be satisfied. On the other hand the use of paper pulp instead of corn syrup as the carbohydrate material leads to a process satisfying all the requirements set previously.

According to this process variation, sheets of paper pulp are thoroughly impregnated with a titanium trichloride solution. After impregnation, the excess solution is removed and the paper pulp set to dry. After drying, the paper pulp is immersed in ammonium hydroxide to achieve the complete conversion of the titanium chloride to insoluble titanium oxide. Owing to the rapid precipitation of the titanium chloride impregnated in the paper pulp, the resulting titanium oxide is present in the paper pulp as a fine dispersion. This is demonstrated by the absence of an X-ray diffraction lines characteristic of titanium oxide. Being insoluble, this fine dispersion of titanium oxide is not affected by the intensive washing which is necessary for the removal of ammonium chloride. After an intensive washing and drying, the paper pulp is then impregnated with a barium solution, such as barium nitrate or the more soluble barium acetate, with a concentration adjusted to yield a titanium to barium molar ratio equal to about 1. After removal of the excess barium solution, the paper pulp is ignited in air at a furnace temperature of 600° C. X-ray diffraction patterns show the ignited powder to be fine grained barium titanate.

Owing to the difficulty of a complete removal of the ammonium chloride by washing the impregnated paper pulp, traces of barium chloride can be found with the barium titanate after ignition. This chloride can be removed in the same manner as previously described. This treatment will not affect adversely the barium titanate already present in the powder, but will add to it a small amount of barium carbonate and titanium oxide. Calcination at 600° C will yield a single phase powder of barium titanate. Time of calcination will depend directly on the amount of barium carbonate, titanium oxide present, and for small amounts will be relatively short.

The powder prepared by the process of this invention can contain other metals in addition to barium, titanium, strontium and iron.

Examples of metals which can be employed in the process of this invention include beryllium, magnesium, calcium; the Group IIIB metals, i.e., scandium, yttrium and the lanthanide and actinide elements; the Group IV B metals, i.e., titanium, zirconium, and hafnium; niobium and tantalum; the Group VI B metals, i.e., chromium, molybdenum and tungsten; manganese; iron; cobalt; nickel; copper; zinc; cadmium; aluminum; gallium; tin and bismuth.

In addition to the above metals, the process of this invention can also be employed to prepare metal oxides which are comprised of two or more metals. These oxides which are stable and have melting points preferably above 700° C. In addition to the aforementioned metals, these include the Group I A elements with the exception of hydrogen, i.e., lithium, sodium, potassium, rubidium, cesium and francium; radium, vanadium, technetrium, rhenium, ruthenium, osmium, rhodium, iridium, palladium, platinum, silver, gold, mercury, iridium, thallium, lead, antimony and polonium.

It has been observed that the mean particle size of the metal oxide particles prepared by the process of this invention is below 1.0 micron, and usually below 0.1 micron. The individual particles remain unresolved at 11,000 magnification. X-ray powder diffraction analysis indicates an ultimate particle size within the range of from about 200 to about 1000 Angstroms.

The best way to characterize the powder is in terms of its sinterability at temperatures substantially lower than the temperatures that have been employed with metal oxides, such as barium titanate powders, heretofore available. With barium titanate for instance, after the powder has been compacted to at least 40 percent of fully dense oxide, the compacted products sinter, without application of external pressure (and without the use of sintering aids), to a shape having a density of at least 90 percent of fully dense barium titanate at a temperature of from about 1100° to about 1200° C. Analogous lowering of sintering temperatures are encountered with the other metal oxide powders provided by the invention.

The invention also provides sintered metal oxide bodies having strenghts significantly higher than sintered metal oxide bodies heretofore available. The high strenght of these sintered bodies is apparently the direct result of the ability of the finely divided metal oxide powders of the invention to sinter at substantially lower temperatures than the prior art metal oxide powders. Because of the lower sintering temperatures, grain growth is lessened. Since strength, in many cases, bears an inverse relationship to grain size, the smaller grain size of the sintered metal exhibits higher strength.

The sintered metal oxide objects of the invention can be prepared by conventional sintering techniques, except that the temperatures that can be employed are significantly lower than those heretofore employed for sintering metal oxide powders. The metal oxide sintered bodies can be hot pressed, or they can be cold pressed followed by heating to sintering temperature.

The finely divided barium titanates of the invention comprise a class of known materials in a novel form, i.e., having utlra-fine particle size. The known utility (e.g., as polishing powders and as additives such as opacifiers for glass) of these metal oxides is enhanced, in many cases, bu the ultra-fine particle size provided by the invention. The barium titanate powders, particularly those mixed with other metal oxide powders, are useful in the preparation of high strength compacted shapes which can be utilized in high temperature, and/or corrosive environments. High strength and high surface area sintered bodies can be utilized in the preparation of catalysts, catalyst supports and the like. The sintered metal oxide objects of the invention can also be used as refractories, crucible liners, heat shields, and the like.

The process of this invention is also useful for the preparation of barium titanate with other metal oxides. Since the electrical properties of barium titanate are strongly dependent on its composition, dielectric compositions are prepared using mixtures of barium titanate with smaller additions of specific metal oxides. Since blending of fine grained barium titanate powders with coarse grained oxide powders would inevitably lead to inhomogeneous mixtures, the availability of other fine grained oxide powders would certainly improve the homogeneity of the mixtures.

An important aspect of the precursor process is its ability to prepare a variety of metal oxides of high surface areas and in a fine state of dispersion. As described in the aforementioned Belgian application, fine grained metal oxide powders can be prepared from inorganic compounds such as the chlorides.

During the preparation of ceramic compositions, the dielectric powders, barium titanate with metal oxide additions, are transformed by firing into a solid polycrystalline mass. During this process, the oxide additions will assist and promote the proper diffusion and reactions necessary to obtain the desired sintering and electrical characteristics. The completeness of the sintering and the integrity of the electrical properties are very much dependent not only on the identity of the oxide additives, but also on the extent of their dispersion and ability of some oxide additives to form solid state solutions with barium titanate.

An important process improvement consists of replacing the mechanical blending of powders by the preparation of a powder, by the precursor process, starting directly from a unique solution containing not only the titanium and barium compounds for barium titanate preparation, but also other metal compounds such as to give the desired metal oxide additives in the resultant powder. By ignition in air, the organic material is burned off, leaving a fine grained powder composed of an intimate mixture of barium titanate with the metal oxide additives. Owing to the intimacy of mixtures obtained in the original solution, this process extension can be adequately used to prepare fine grained powders not only of barium titanate doped with small amounts of metal oxides, but also solid state solution of metal oxides in barium titanate.

In another embodiment, the process of this invention can be employed for the preparation of certain submicron ferrite powders. For instance, hexagonal strontium ferrite powder can be prepared from solution of reagent grade ferrous chloride and either strontium chloride or strontium nitrate. Ferrous chloride is preferred over ferric chloride due to the ease of obtaining a clear solution. The presence of a small amount of insoluble iron compound with the ferrous chloride can easily be corrected by addition of some hydrochloric acid. The solution of the salts are mixed with an equal volume of corn syrup and the resulting mixture slowly heated until charred. During this process, the solution is dehydrated while degradation of the corn syrup occurs. Degradation of the corn syrup in the preparation is allowed to proceed until a char is obtained.

The following examples are illustrative:

EXAMPLE 1

This example demonstrates the preparation of submicron size barium titanate powder. The solution used in this example was prepared in the following way: separate solutions of barium nitrate in water and of titanium tetrachloride in corn syrup were first prepared; they were then mixed together and an additional amount of corn syrup added to the mixture to yield the final solution. The barium nitrate solution was prepared by dissolving 480g or anhydrous barium nitrate in 6 liters of water. A second batch of the same solution was prepared in the same way. The barium nitrate solution was assayed to contain 46.1g equivalent barium oxide per liter of solution. The titanium tetrachloride in corn syrup solution was prepared in the following way: one liter of corn syrup sold by Best Foods under the trademark "Karo," was thoroughly mixed with one liter of water and 100cc of concentrated hydrochloric acid, 200cc of titanium tetrachloride were then added drop by drop to this mixture with good agitation. Two batches of this solution were prepared and mixed together. The resulting titanium tetrachloride solution in corn syrup was assayed to contain 64.2g of equivalent titanium oxide per liter of solution. Finally the barium nitrate-titanium tetrachloride-corn syrup solution was prepared in the following way: 9.425 l of the barium nitrate solution, 3.510 l of the titanium tetrachloride solution and approximately 9.5 l of corn syrup (Karo) were combined and thoroughly mixed together.

The resulting solution was then heated on a hot plate until dry. During this process, the solution was converted into a char. The resulting char was then ignited in a furnace at 600° C with an excess of air until the carbonaceous material was burned off.

The resulting ashes were treated with an excess of concentrated ammonium carbonate solution with agitation for three days. Intimate contact between the powder and the ammonium solution was obtained by ball milling the powder with zirconia beads, 1/16 inch in diameter, in polyethylene bottles. Following the ball milling operation, the ammonium solution was removed and washed away using distilled water to which were added 12–15 drops of ammonium hydroxide and 4 drops of dispersant sold under the trademark "Darvan C" by W. R. Grace & Co. per liter. Washing was repeated with strong agitation using each time fresh washing solution. During successive washing, a dispersion of fine material was obtained. The dispersed fraction was separated from the undispersed fraction by subjecting the mixture to centrifugation, followed by decantation of the dispersed fraction. This process, washing - centrifugation - decantation, was repeated several times to retrive the maximum amount of dispersed material. The undispersed fraction or coarse fraction, was collected separately and dried. The dispersed fraction was allowed to settle partially with time and was then again subjected to centrifugation. From this last centrifugation, the dispersed fraction was decanted from the undispersed fraction. The later undispersed fraction or fine fraction, was collected separately and dried. It accounted for the largest amount of material recovered. The final dispersed fraction or extra fine fraction, was floculated by addition of ammonium carbonate solution, collected and dried.

Each fraction was identified by X-ray diffraction to be an intimate mixture of titanium oxide and barium carbonate. Each fraction was then subjected to a calcination treatment at temperatures ranging from 600° C up to 700° C in increments of 25° C. Residence time at each temperature was kept long, ranging from several hours up to 5 days and was determined by the relative progress of the reaction by which barium titanate is formed by calcination of titanium oxide and barium carbonate. The progress of this reaction was followed from X-ray diffraction patterns of samples obtained during the course of calcination, by comparing the relative peak intensities for barium titanate and barium carbonate.

After calcination, the coarse fraction was characterized by X-ray diffraction to be barium titanate. Its crystallite size was estimated from X-ray line broadening to be in the 260 A range. The fine fraction, calcined in two batches was characterized to be barium titanate with a small amount of unreacted titanium oxide and barium carbonate. Its crystallite size, for each batch, was estimated to be in the 245 A and 275 A range respectively. The extra fine fraction was not completely calcined and was characterized to be a mixture of barium titanate, titanium oxide and barium carbonate.

EXAMPLE 2

This example demonstrates the preparation of submicron size barium titanate powder. The process used in this example consisted of a double impregnation of paper pulp with two different solutions, one of titanium trichloride, the other of barium acetate. The solutions used in this example were prepared in the following way: reagent grade titanium trichloride was extended with enough water such that the resulting solution had a specific gravity of 1.105g/cc; anhydrous barium acetate was dissolved in enough water such that the resulting solution had a specific gravity of 1.144 g/cc.

Sheets for paper pulp were soaked for several hours in the titanium trichloride solution. The excess solution was then removed by subjecting the wet sheets to centrifugation. The sheets were then set dry. After drying, the sheets were immersed for three hours in concentrated ammonium hydroxide. After this treatment, the sheets were thoroughly washed by soaking first in water, then subject to centrifugation to remove the wash matter. This washing treatment was repeated several times, after which the sheets were set to dry. After drying the sheets were immersed in the barium acetate solution for several hours, Again, the excess solution was removed by subjecting the sheets to centrifugation.

The impregnated sheets of paper pulp were then ignited in a furnace at 600° C with an excess of air. The resulting powder was characterized by X-ray diffraction to be barium titanate with only a small amount of barium chloride owing to the difficulty of completely removing the totality of the chloride by washing. Its crystallite size was estimated from X-ray line broadening to be in the 240 A range. In the same manner as in Example 1, the small amount of remaining chlorides was removed by treating the powder with concentrated ammonium carbonate. After a calcination at 600° C for 18 hours, the resulting powder was characterized to be barium titanate.

EXAMPLE 3

This example demonstrates the preparation of submicron size strontium ferrite powder. The solution used in this example was prepared in the following way: 47.8g of ferrous chloride ($FeCl_2 \cdot 4H_2O$) and 6.88 of anhydrous strontium nitrate were dissolved into 100cc of water. To this solution 100 cc of corn syrup (Karo) was added and thoroughly mixed with the solution. The resulting solution was then heated at 200° C until dry. During this process, the solution was converted into a char. The resulting char was then ignited in a furnace at 400° C. The resulting ashes were treated with an excess of concentrated ammonium carbonate solution with agitation for 1 day. Intimate contact between the powder and the ammonium solution was obtained by ball-milling the powder with zirconia beads, 1/16 inch in diameter, in a polyethylene bottle. Following the ball-milling operation, the ammonium solution was removed and washed away using distilled water to which were added enough ammonium hydroxide to obtain a pH value of 9 to 10, and about 7 drops of dispersant (DARVAN C) per liter. Washing was repeated with strong agitation using each time fresh washing solution. During successive washing, a dispersion of fine material was obtained. The undispersed fraction was then allowed to settle and the dispersed fraction was separated from the undispersed fraction by decantation. This process, washing - settling - decantation, was repeated several times to retrieve the maximum amount of dispersed materials. The dispersed fraction was then flocculated by addition of ammonium carbonate. The flocculated material was allowed to settle and recovered.

After drying, this fraction was identified by X-ray diffraction to be an intimate mixture of hematite and strontium carbonate.

A portion of this powder was then subjected to a calcination treatment at 800° C for 3 hours. The progress of the calcination treatment was followed by X-ray diffraction of samples taken every hour. During the calcination treatment, the strontium carbonate and the hematite were observed to react and yield the hexagonal strontium ferrite. Another portion of this powder was subjected to a similar calcination treatment at 900° C for 1 hour and 30 minutes. X-ray diffraction of the resulting powder indicated the formation of hexagonal strontium ferrite and the absence of hematite and carbonate.

Although the invention has been illustrated by the preceding examples, it is not to be construed as being limited to the materials employed therein, but rather, the invention encompasses the generic area as hereinbefore disclosed. Various modifications and embodiments of this invention can be made without departing from the spirit and scope thereof.

What is claimed is:

1. A process for the preparation of sub-micron metal oxide powders which process comprises the steps of:
    a. contacting a carbohydrate material with compounds of at least two metals selected from the group consisting of barium, titanium, iron and strontium, at least one of which compounds contains a chloride ion to form a mixture thereof,
    b. charring said mixture,
    c. igniting said mixture to produce fragile agglomerates of sub-micron particle size,
    d. contacting the agglomerates with an aqueous solution of a soluble ammonium compound to form ammonium chloride,
    e. recovering the agglomerates from solution and washing to remove any ammonium chloride,
    f. calcining the agglomerates to convert said mixture to the metal oxide, and
    g. comminuting the agglomerates to produce finely divided metal oxide powder having a mean particle size below 1 micron.

2. The process of claim 1 wherein said metals are barium and titanium.

3. The process of claim 1 wherein said metal oxide powder is a ferrite.

4. The process of claim 3 wherein said ferrite is comprised of iron and strontium.

5. The process of claim 1 wherein said metal oxide powder is sintered into an integral object.

* * * * *